H. L. PARRISH.
DRIVING-GEAR FOR MOTOR VEHICLES.
APPLICATION FILED FEB. 28, 1908.
924,821.
Patented June 15, 1909.
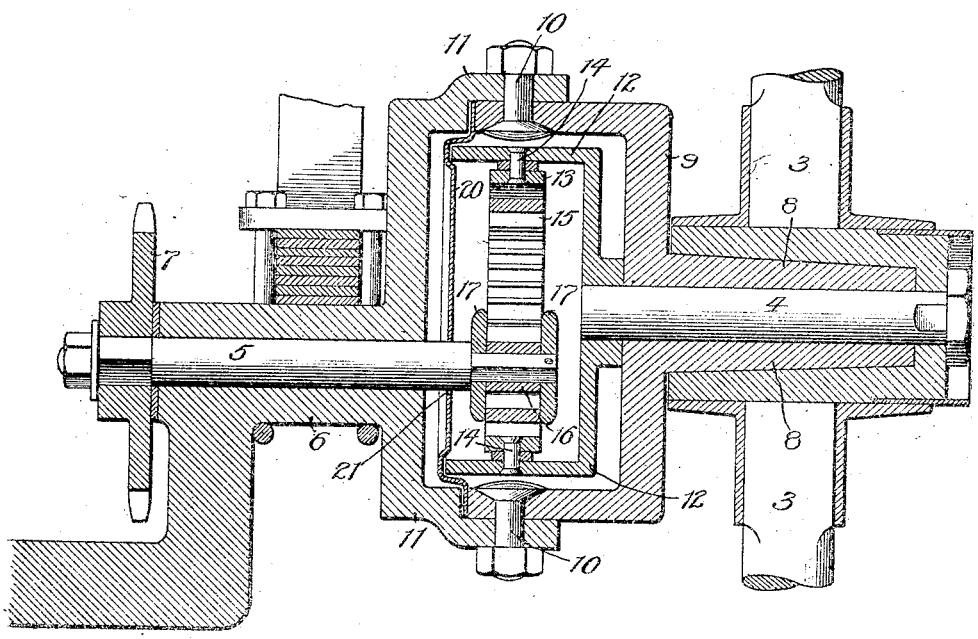
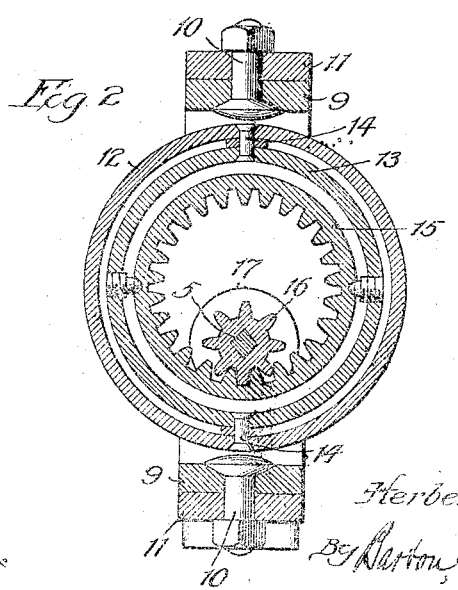
Witnesses:
McClelland Young.
Irving MacDonald.
Inventor:
Herbert L. Parrish.
By Barton Stanner Folk
Attys.

UNITED STATES PATENT OFFICE.

HERBERT L. PARRISH, OF BENTON HARBOR, MICHIGAN.

DRIVING-GEAR FOR MOTOR-VEHICLES.

No. 924,821.

Specification of Letters Patent.

Patented June 15, 1909.

Application filed February 23, 1908. Serial No. 412,225.

*To all whom it may concern:*

Be it known that I, HERBERT L. PARRISH, citizen of the United States, residing at Benton Harbor, in the county of Berrien and State of Michigan, have invented a certain new and useful Improvement in Driving-Gear for Motor-Vehicles, of which the following is a full, clear, concise, and exact description.

This invention relates to a driving gear for motor cars, and is particularly intended for that class of cars in which the steering wheels are positively driven.

The invention will be especially applicable to heavy trucks in which each of the four wheels is positively driven, and both front and rear wheels are arranged to turn from side to side reciprocally in steering.

The object of the invention is to provide an improved, simple and strong construction whereby power may be transmitted from a driving shaft to a steering axle through gearing adapted to reduce the speed of the axle below that of the driving shaft. To this end my invention contemplates the mounting of one of the members of the reduction gearing in pivotal supports arranged to form a universal joint with the driving axle, such that the driving axle may be turned at any angle to the driving shaft, while receiving rotary motion therefrom at a reduced speed, through said reduction gearing.

I will describe my invention more particularly by reference to the accompanying drawing, in which—

Figure 1 is a transverse sectional view of the driving gear, taken on the line of the axle; and Fig. 2 is a sectional view taken on the line of the pivotal axis of the steering axle.

The same reference characters indicate the same parts in both figures.

The wheel 3 is provided with a driving axle or spindle 4, the outer end of which is fixed to the hub of the wheel, while the inner end is coupled through the universal joint and reduction gearing to the driving shaft 5, which is journaled in the axle frame 6. The inner end of the driving shaft 5 is arranged to be rotated by any suitable power transmitting mechanism, a sprocket wheel 7 being shown, over which a driving sprocket chain may be passed. The mounting for the live axle or spindle 4 of the wheel is arranged to turn from side to side about a vertical axis for the purpose of steering the vehicle. As shown, the live axle 4 passes through a dead axle 8 upon which the wheel 3 is arranged to rotate; this dead axle being carried by a yoke 9 which is pivoted by bolts 10, 10, to the upper and lower frames or extensions 11, 11, of the axle frame 6.

The reduction gearing and universal joint between the driving shaft 5 and the live axle or spindle 4 are, in the form shown, constructed as follows: The inner end of the spindle 4 is provided with a hollow cylindrical head 12 in which a gimbal ring 13 is pivoted transversely upon trunnions 14 which are located in the same plane as the pivots 10, 10, upon which the axle swings in steering. The gimbal ring 13 carries an internal gear 15 which is pivoted in said gimbal ring upon an axis at right angles with the pivotal axis 14, 14, of said gimbal ring, but in the same plane therewith. The internal gear 15 thus has a universal connection with the spindle 4, so that its axis of rotation may remain fixed relatively to the axis of the driving shaft 5, while permitting the axle 4 of the wheel to be turned to any angular position. The driving shaft 5 carries a pinion 16 which is arranged to mesh with the internal gear 15 and to impart rotary motion thereto. The ends of the pinion 16 are provided with wide projecting flanges 17, 17, which fit over the edges of the coöperating internal gear 15, and maintain said gear in proper alinement. It will be understood that by this arrangement the rotary motion received by the driving shaft 5, as from the sprocket 7, is transmitted by the pinion 16 to the internal gear 15, which, being of considerably larger diameter, is rotated at a much slower speed than the shaft 5. The rotation of the gear 15 is transmitted through the medium of the gimbal ring 13 to the cylindrical head 12 of the driving spindle 4, and so to the wheel, whatever may be the angular position (within reasonable limits) to which the wheel may be turned in steering.

The reduction gear and universal joint may be inclosed in any suitable manner to avoid obstruction by dust and dirt. The cylindrical head 12 forms in itself an inclosing shell for the mechanism gearing; and I have shown the inner or open end of the cylinder 12 covered by a sheet metal head 20, which is mounted upon the yoke 9 of the steering axle, and is arranged to fit over the edge of the cylinder 12, while permitting said cylinder to rotate freely. The head or cover 20 is provided with a slot 21 through which the driving shaft 5 passes, this slot being elongated sufficiently so that said cover 20 will not interfere with the proper turning of the steering axle about the pivots 10, 10.

It will be appreciated that by means of this invention each of the four wheels of the vehicle may be arranged to turn upon a steering axle, while being positively driven from the motor, whose rotary effort is transmitted efficiently at high speed to the driving shafts 5 and delivered to the wheels at a slow speed, through the reduction gearing, which is located at the nearest available point to said wheels. This construction makes it possible to apply great power to the wheels, while having the parts concerned in the transmission light, simple and easily constructed.

It will be apparent that my invention is capable of modification, and I do not desire to be understood as limiting myself to the precise arrangement shown, but Having explained the principle of my invention, and the best mode in which at present I contemplate applying this principle, I claim:

1. In a driving gear for motor vehicles, the combination with a driving shaft carrying a pinion, of an internal gear meshing with said pinion, a wheel having a driving spindle, and pivotal connections forming a universal joint between said internal gear and said driving spindle.

2. In a driving gear for motor vehicles, the combination with two shafts and bearings therefor arranged to have a relative movement upon a pivotal axis, of a head for one of said shafts, a gimbal ring pivotally mounted in said head, an internal gear wheel pivotally mounted in said gimbal ring upon an axis transverse to the pivotal axis of said ring, and a pinion carried by the other shaft meshing with said internal gear.

3. In a driving gear for motor vehicles, the combination with a driving shaft carrying a pinion, of an internal gear meshing with said pinion, a gimbal ring in which said internal gear is pivoted, a support in which said gimbal ring is pivoted upon an axis transverse to the axis in which said internal gear is pivoted, and a driven shaft carrying said support for the gimbal ring.

4. In a driving gear for motor vehicles, the combination with a pivoted steering yoke 9 carrying a wheel, of a live axle 4 for said wheel, a hollow cylindrical head carried by said live axle, a gimbal ring pivoted in said cylindrical head upon an axis in the same plane with the pivotal axis of the steering yoke, an internal gear hung in said gimbal ring upon pivots transverse to the pivotal mounting of said ring, and a driving shaft having a pinion meshing with said internal gear, and means for maintaining said pinion and internal gear in operative relation to each other.

5. In a driving gear for motor vehicles, the combination with a wheel, of an axle frame, a steering axle pivoted to said frame and supporting said wheel, a live spindle fixed to said wheel and passing through said steering axle, a universal coupling one member whereof is carried by said spindle, a gear wheel carried by another member of said universal coupling, and a stub driving shaft pivoted in the axle frame and having a pinion meshing with said gear.

In witness whereof, I, hereunto subscribe my name this 12th day of February, A. D., 1908.

HERBERT L. PARRISH.

Witnesses:
D. C. TANNER,
A. H. MOORE.